INVENTORS
GAYLORD W. BROWN
DONALD J. RISE

ATTORNEYS

INVENTORS
GAYLORD W. BROWN
DONALD J. RISE

INVENTORS
GAYLORD W. BROWN
DONALD J. RISE

ATTORNEYS

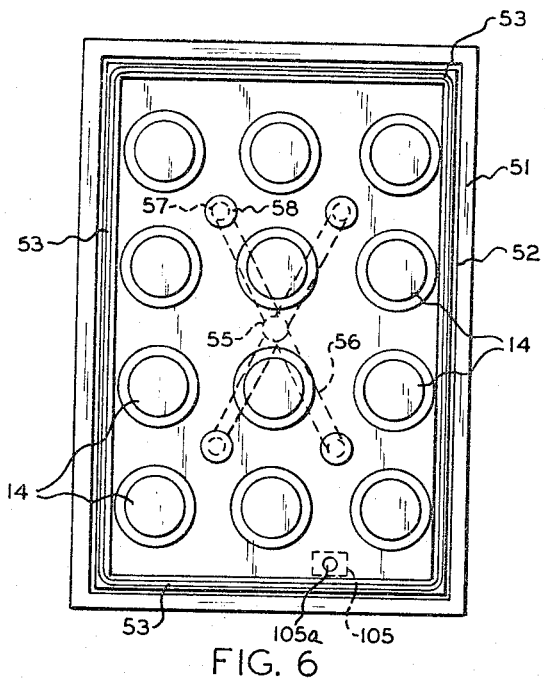
FIG. 6
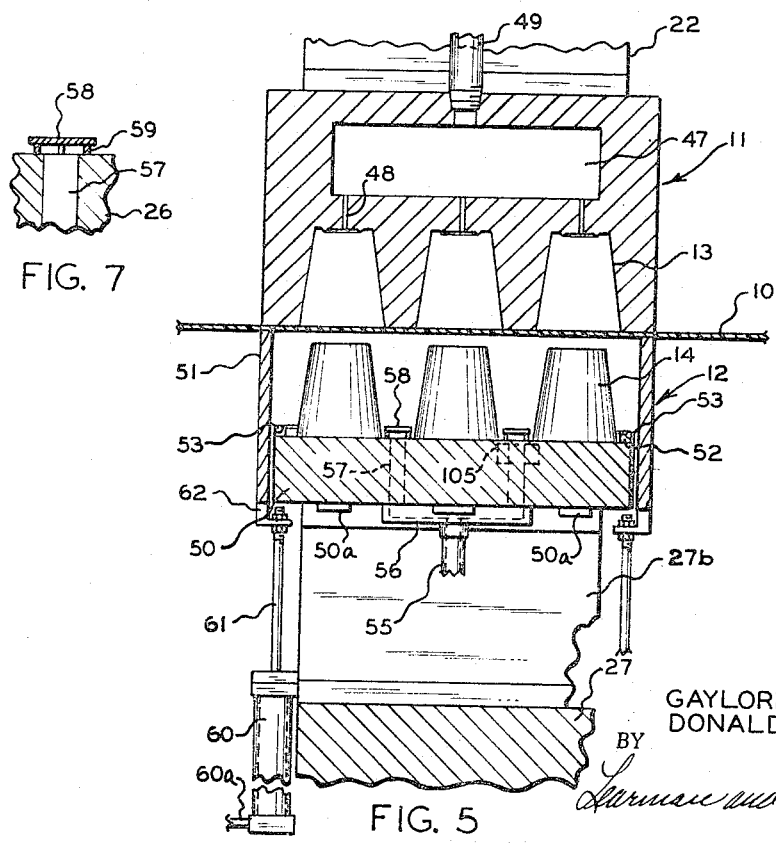
FIG. 7
FIG. 5
INVENTORS
GAYLORD W. BROWN
DONALD J. RISE
BY
ATTORNEYS

United States Patent Office 3,346,923
Patented Oct. 17, 1967

3,346,923
DIFFERENTIAL PRESSURE FORMING
MACHINE
Gaylord W. Brown and Donald J. Rise, Beaverton, Mich., assignors to Brown Machine Company of Michigan, Inc., a corporation of Michigan
Filed July 10, 1963, Ser. No. 293,959
12 Claims. (Cl. 18—19)

This invention relates to differential pressure forming machines for molding articles in thermoplastic material, and more particularly to certain novel and useful improvements in machines of this nature which permit such machines to cycle more rapidly and therefore to produce an increased quantity of products in a given operating time. The invention is concerned with a machine of the type which can be placed in position for in-line operation with an extruder issuing a continuous sheet of thermoplastic material, or which may be adapted to mold sheets of thermoplastic material which are drawn from a roll. Accordingly, such machines usually include banks of heaters, mounted above and below the level of the sheet which is brought into the machine, to bring the plastic to the forming temperature. Further, forming machines of this character usually employ a pair of platens, one above and one below the sheet or web of material, for mounting male and female die members which cooperate to form products in the preheated sheet of material in accordance with the configuration of the molds. Such machines may be deep draw machines such as are suitable for forming cups and the like or shallow draw machines for forming articles such as cup lids and like articles. Generally speaking, in deep draw machines of this type the male dies are plug assists which aid in moving portions of the plastic sheet into the female cavities, and a vacuum pump is connected to the female cavities to draw the material into engagement with the walls thereof at an appropriate time. Nesting chains are conventionally employed to clamp the sides of the sheet material and at intervals to draw successive lengths of it from the heating zone to a position between the forming dies.

One of the prime objects of the present invention is to provide a machine to form products in a plastic web which can be brought between the forming dies and formed at a lower temperature than heretofore possible, without losing the detail of the dies in the formation process.

A corollary object of the invention is to also provide a machine in which the molds can be used at lower temperatures than the molds of conventional machines, so that the less hot web virtually sets instantaneously when it is brought into intimate contact with the molds and it is not necessary to wait a certain time for the material to cool and set prior to stripping the molds and commencing the next cycle. The deep draw machine which will presently be described can process a sheet which is nearer to setting temperature and can employ a mold which is substantially at room temperature, because air under pressure is employed in conjunction with the suction forces to insure 100% contact of the sheet with the female mold cavities and accordingly 100% heat transfer between the mold surfaces and sheet. However, it has been determined that when air under pressure is introduced in the forming operation the molds tend to separate so that air is lost and this affects the uniformity of the parts molded. The present invention provides means which load the vacuum and air box die frames in a direction to take up the slack in the machine frame, so to speak, and effect a positive seal which permits uniformity to be achieved.

It is another object of the present invention to employ toggle means on the forming machine for effecting this loading and toggle means actuators which are not mounted on the machine frame and restrained thereby, the actuators being so mounted that the preloading forces in the present instance are exerted only in the vertical direction.

A further object of the invention is to provide a machine which applies the air pressure to the sheet in a manner which does not create cold spots on the sheet which would not be formed with the full detail of the molds.

Other objects and advantages of the invention will be pointed out specifically or will become apparent from the following description when it is considered in conjunction with the appended claims and the accompanying drawings, in which:

FIGURE 5 is an enlarged, transverse, sectional view with the die boxes shown in confronting relationship with the plastic web;

FIGURE 6 is a top plan view of the lower die box and the plug assist members which it carries;

FIGURE 7 is a still more enlarged, fragmentary view illustrating one of the baffles used to deflect one of the air streams which are released to pressurize the lower die box at a designated time in the forming operation and prevent the air stream from forming a cold spot on the plastic sheet which would prevent a proper molding of the plastic with the necessary detail;

Figure 2:
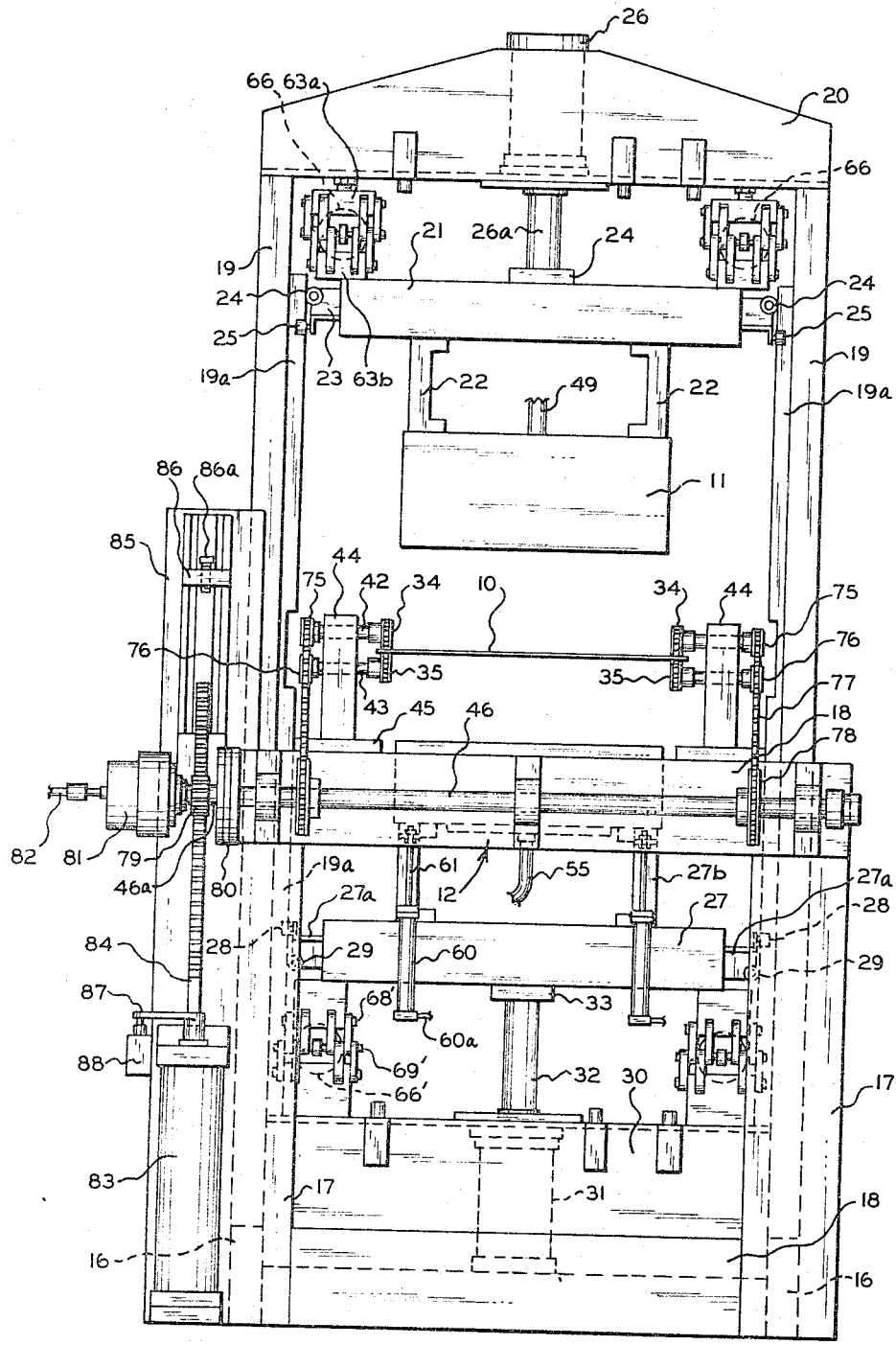
FIGURE 2 is a front end elevational view thereof.

Referring now more particularly to the accompanying drawings, wherein only a preferred embodiment of a deep draw machine is illustrated, a web 10 of a suitable thermoplastic material, such as polystyrene, is shown in FIGURES 2 and 5 disposed between a female die box assembly generally designated 11 and a male die box assembly generally designated 12. For the sake of convenience, the female die box assembly 11 is shown as having spaced apart cavities 13 of a size to form a truncated, cone-shaped, thin-walled cups in the plastic web suitable for use as drinking cups when separated from the web, and it will be noted that the male die box assembly 12 includes spaced apart, plug assist members 14 in vertical axial alignment with the cavities 14. The cups, which are formed in the plastic web 10, are formed in inverted position and the formed web is then fed through a separate trim press which severs the cups from the web.

Figure 1:
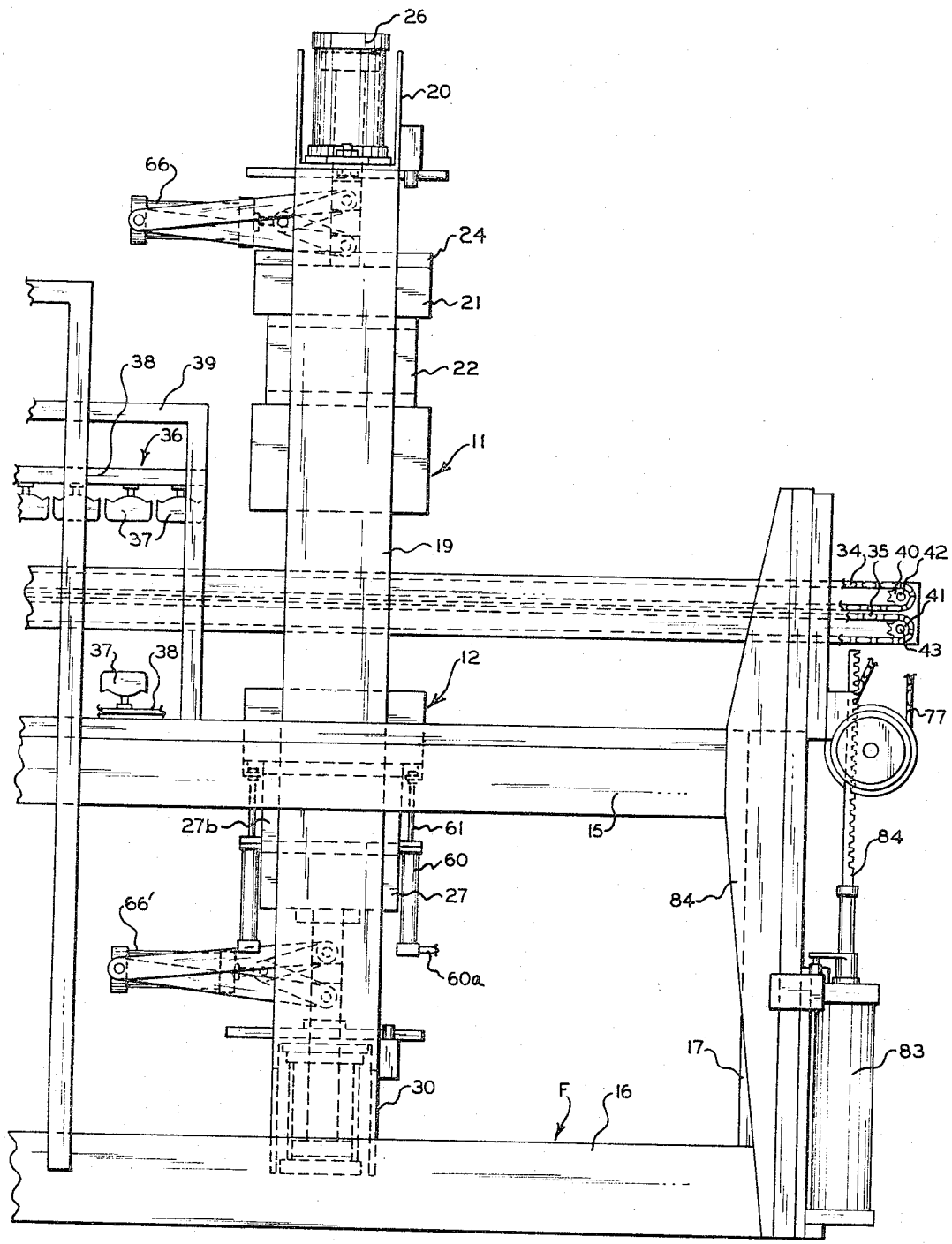
FIGURE 1 is a side elevational view of the portion of the machine with which the invention is concerned.

The frame of the forming machine, which is generally designated F, is shown, for the sake of convenience, as comprising upper and lower longitudinal sill members 15 and 16, respectively, which are connected at both ends by vertical members 17 and upper and lower end cross members 18. Only the front end of the machine is shown in FIGURES 1 and 2. However, it is to be understood that the frame F is oblong in shape and that the left end also includes suitable end connecting members. Mounted intermediate the ends of the frame are vertical columns 19 which are joined to the lower sill members 16 at their lower ends and are connected by a header channel member 20 at their upper ends. It is the function of the columns 19 to support the female die box assembly 11 and the male die box assembly 12 for vertical travel.

Vertical rails 19a are secured on the inner walls of the columns 19 to furnish guide surfaces for a vertically traveling upper platen 21 which carries the female die box assembly 11, angle members 22 supporting the assembly 11 on the platen 21, as shown. It will be seen that transversely extending angle brackets 23 on the platen 21 support follower roller members 24 and 25 which guide on the inner and side faces of the guide rails 19a, as shown, during vertical travel of the platen 21. Mounted on the header member 20 is a pressure fluid cylinder 26 including a piston rod 26a which is coupled to the platen 21 by a member 24, and clearly, when a suitable fluid under pressure, such as air, is introduced to the upper end of the double-acting cylinder 26, the platen 21 will be lowered toward the plastic web 10.

A lower platen 27 is also mounted for vertical travel on the guides 19a, there being angle brackets 27a provided on the sides of the platen 27 which mount follower rollers 28 and 29 and angle members 27b which connect the platen 27 and die box assembly 12. A sill channel member 30 connects the lower ends of the columns 19 and houses a double-acting, lower platen, pressure fluid cylinder 31 which has a piston rod 32 coupled, by a member 33, to the lower platen 27.

The plastic web 10 is fed intermittently between the upper and lower die assemblies 11 and 12 in the usual manner by pairs of superposed, nesting, upper and lower endless chains 34 and 35, respectively, which are intermittently powered to advance the plastic web 10 from a heating station generally designated 36 (see FIGURE 1). The heating station 36 comprises banks of electrically powered heaters 37 mounted on crossbars 38 supported on a frame 39. While only a few of the heaters 37 are shown, it is to be understood that to the left of the portion of the machine shown in FIGURE 1 are banks of heaters above and below the level of the plastic sheet 10 which bring the plastic to the forming temperature. The material advancing chains 34 and 35 are trained around sprockets 40 and 41 at each end which are supported by shafts 42 and 43 journaled by bearing block members 44 (FIGURE 2) on support plates 45 which extend from the end sill member 18. The manner in which the chains 34 and 35 are driven by a shaft 46 will be later explained. For the present, it is simply to be understood that a heated portion of the plastic web 10 is advanced to a position between the die units 11 and 12 by the chains 34 and 35 and that the units 11 and 12 are then moved vertically to the plastic web 10 so that the forming operation can take place.

The upper die unit 11 includes a vacuum manifold chamber 47 which connects to the cavities 13 by means of passages 48, and a line member 49 is employed to connect the vacuum manifold chamber 47 with a conventional rotary pump and surge tank. The vacuum pump which has been found suitable for the purpose is that manufactured by Gast Manufacturing Co. of Benton Harbor, Mich., which is a 1½ horsepower, 21.6 cubic feet per minute pump.

The plug assist box assembly 12 includes a member 50 mounting the plug assist members 14 in spaced apart relation and a surrounding clamp frame 51. It is to be understood that there is a clearance of about ⅛ inch between the clamp frame 51 and the member 50, and that the member 50 includes a rim 52 mounting a resilient seal 53 which maintains a sealed airtight relationship between the web 10 and plug assist mounting member 50. The member 50 may be electrically heated by thermostat incorporating resistance heating elements 50a of the chromalox type. Air under a pressure of about 80 p.s.i. and traveling at about 20 cubic feet per minute is supplied to the assembly 12 via a line 55 which connects with pipes 56 leading from the air supply hose 55 to bored openings 57 in the member 50 and, as shown in FIGURE 7, baffle plates 58 are supported over each of the openings 57 on spaced apart pins 59 so that the air stream passing through openings 57 is deflected laterally and does not impinge directly on the plastic web 10. This prevents cold spots from being formed on the plastic sheet 10 which would not be moldable to take the detail of the die cavities 13. Mounted by the angle members 27b in position to urge the clamping frame 51 upwardly into engagement with the plastic strip 10 are pressure fluid cylinders 60 including piston rods 61 connected to brackets 62 which secure to the clamping frame 51. A pressure of about 80 p.s.i. is maintained in the cylinders 60, which are connected through lines 60a at their lower ends to a suitable source of air under pressure.

Figure 4:
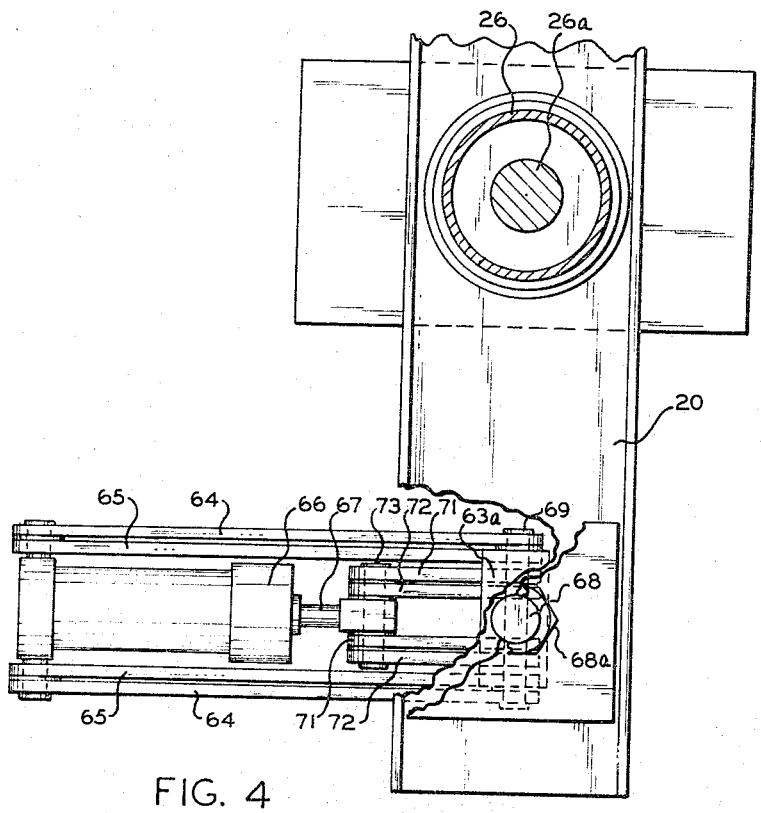
FIGURE 4 is a fragmentary, top plan view thereof with parts of the frame broken away to more clearly illustrate elements of the mechanism which otherwise would be obscured.

In order that the platens 21 and 27 will remain in tightly sealed relationship with the plastic web 10 during the time the forming operation is taking place, toggle mechanism is provided for forcing the platens 21 and 27 toward one another and locking them in position. Toggle mechanism is provided in association with both the upper platen 21 and the lower platen 27, and is particularly illustrated in FIGURES 3 and 4. Mounted at each side of the platen 21 and connected to the channel member 20 and platen 21 are a pair of spaced apart blocks 63a and 63b and it will be seen that pairs of links 64 and 65 at each side of the platen 21 connect the upper and lower blocks 63a and 63b, respectively, with the outer end of horizontally disposed pressure fluid cylinder 66 which has a piston rod 67. The blocks 63a are connected to the channel 20 by threaded members 68 which are secured by nuts 68a. The relatively expandable and contractable links 64 and 65 are pivotally connected to the upper and lower blocks 63a and 63b, at each end of the platen 21, as with pins 69 and 69a, and are pivotally connected to the end of each cylinder 65 by a pin 70. The front end of each piston rod 67 is pivotally connected to the upper and lower blocks 63a and 63b by pairs of links 71 and 72. The links 71 and 72 are connected to the blocks 63a and 63b by the pins 69 and 69a and to the piston rod 67 in each case by a pin 73. Plainly, when fluid is supplied to the cylinder 26 to move the platen 21 downwardly, the links 64–65 and 71–72 are expanded. Then when the piston rods 67 are moved outwardly the links 64–65 and 71–72 are further expanded to preload the system.

It will be noted that the cylinders 66 and associated linkage are utilized at the sides of the lower platen member 27 as well, except that the toggle mechanisms are inverted so that the blocks 63b are uppermost. Accordingly, it will not be necessary to describe the toggle mechanisms for the lower platen 27 in detail. The identical parts are given the same numbers except that primed numerals have been employed. The piston rods 67' of the cylinders 66' are actuated at the same time as the piston rod 32 and function both to aid in raising the platen 27 and to preload the platen 27 in a direction toward the plastic web and lock it in position. Inasmuch as the cylinders 66 and 66' are not in any way mounted on the frame of the machine, the preloading movement is not in any way restricted. The down position of the linkage is indicated in the chain lines in FIGURE 3 and it will be seen that the links 71 and 72 have not quite reached the dead center position assumed after the preloading force is exerted. When the pistons 66 and 66' are actuated the links move to dead center (vertical) position but never beyond it.

The sheet advancing chains 34 and 35 are operated after the forming operation has taken place and the platens 21 and 27 have been retracted vertically, as shown in FIGURE 2. Mounted on the opposite ends of shafts 42 and 43 are sprockets 75 and 76 around which are trained chains 77 which are also trained around sprockets 78 provided on the shaft 46. The mechanism for driving shaft 46 is illustrated in applicants' Patent No. 3,217,852 and will only be briefly described. A pinion 79 mounted on a shaft 46a revolves the shaft 46 when the air operated clutch 80 is engaged, there being a diaphragm housing 81 which engages the clutch 80 when air under pressure is supplied to the diaphragm housing 81 through a line 82 in the manner described in the said application. Cylinder 83 includes a rack 84 connected with its piston rod which is in mesh with the pinion 79 and, as the aforementioned application discloses, when the rack member 84 is moved downwardly air is supplied through the line 82 to the air operated diaphragm housing 81 to engage the clutch 80 and transmit the rotation of pinion 79 to the advancing chains 34 and 35. The cylinder 83 is mounted on a frame column member 85 and mounted on the upper end thereof is a stop bar 86 provided with an adjustable stop bolt 86a, as shown. When the rack 84 is withdrawn to lowered position in its plastic web advancing stroke, an arm 87 thereon actuates a limit switch 88 mounted on the frame 84 and makes a circuit to immediately energize cylinder 83 to force rack 84 upwardly. At this time, however, the clutch 80 is disengaged since the air under pressure has been bled from line 82 and the pinion 79 is not revolved. The rack 84 continues upwardly until stopped by the stop bolt 86a and remains in "up" position until the forming operation has been completed and the platens 21 and 27 withdrawn.

*The control system*

Figure 8:
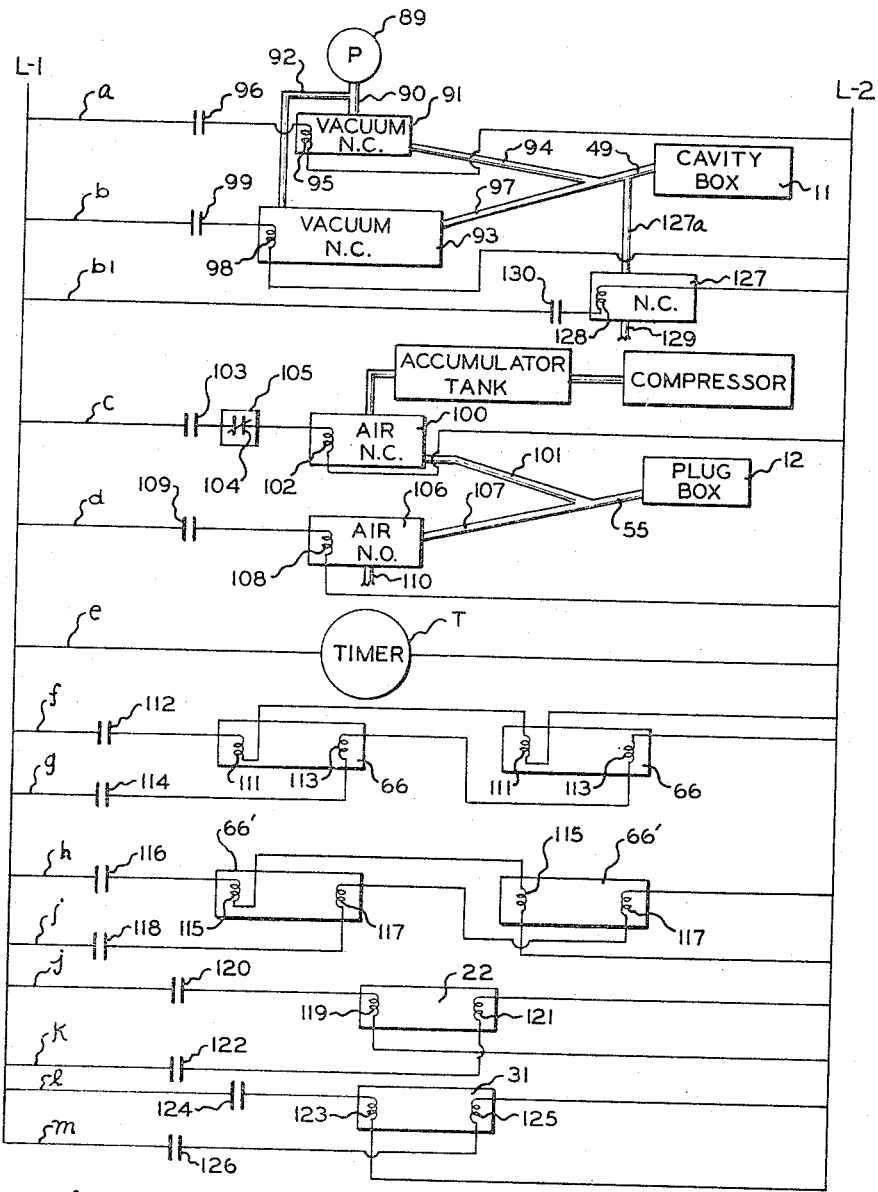
FIGURE 8 is a view illustrating a typical electro-pneumatic circuit which may be used to control the operation of the various elements of the machine.
Figure 9:
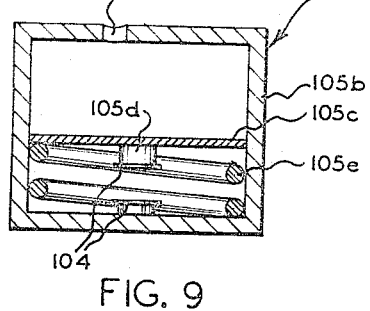
FIGURE 9 is a schematic view of the pressure responsive valve which is employed to limit the pressure of the air in the lower die box.

In FIGURE 8 is shown a typical circuit diagram including line wires L-1 and L-2 and conventional electric and pneumatic components which may be used in the operation of the machine. It is to be understood that other systems may also be used and the instant control arrangement is intended only as exemplary of one system which may be used. The vacuum pump 89 is shown connected by a line 90 to a main vacuum valve 91 and by a branch line 92 to a vacuum bleed valve 93. The valves 91 and 93 may be normally closed Johnson valves of the type manufactured by Johnson Corporation of Three Rivers, Mich., the valve 91 having an attached valve actuator Model AV114CM such as manufactured by Automatic Valve Co. of Farmington, Mich., and the valve 93 having a similar valve actuator. Valve 91 connects with the flexible vacuum line 49 via a line 94 and includes a solenoid 95 connected in a circuit line $a$ with switch contacts 96. The valve 93 is connected with vacuum line 49 via a line 97 and includes a solenoid 98 connected in circuit line $b$ in series with switch contacts 99.

Also provided to supply the plug box assembly 12 with air at the proper time is a normally closed valve 100 connected by means of line 101 with the flexible air supply line 55 leading to the plug box assembly 12. The valve 100 is preferably a normally closed Mac air valve Model No. 4084, such as manufactured by Mechanical Air Controls Inc. of Detroit, Mich., and includes a solenoid 102 connected in series in circuit line $c$ with switch contacts 103. Also connected in circuit line $c$ are the normally closed contacts 104 of a conventional pressure actuated switch 105, the contacts being opened when a predetermined pressure, such as, for example, 40 p.s.i. is reached in the plug box 12. The pressure switch 105 may be the Model 836-T manufactured by Allen Bradley Company of Milwaukee, Wisc. and can be mounted in the member 50 in communication with an opening 105a as shown in FIGURE 6. A schematic representation of a suitable switch is shown in FIGURE 8 and comprises a cylinder 105b within which is a diaphragm 105c having a contact 104 on its stem 105d which is forced normally into engagement with a fixed contact 104 by a spring 105e of predetermined strength. The contacts 104 are suitably insulated from the cylinder and an opening 105f is provided in the cylinder to admit the pressure fluid thereto. A normally open air valve 106 also communicates with the air line 55 via a line 107 and has a solenoid 108 connected in a circuit line $d$ in series with normally open contacts 109. The valve 106 may also be a Mac valve No. 4086 which exhausts to atmosphere out a port 110.

Also, as will be seen, the lines L-1 and L-2 power a timer motor T which is disposed in circuit line $e$. The timer can be an Eagle Multiflex timer of the type manufactured by Eagle Signal Co. of Moline, Ill. The double-acting air cylinders 66 for locking the toggle links 64, 65, 71, and 72, which preload the upper platen 21, are shown as having advance solenoids 111 connected in a series line $f$ with normally open switch contacts 112 and retract solenoids 113 connected in a circuit line $g$ with normally open switch contacts 114. Similarly, the double-acting air cylinders 66' which preload the lower platen 27 are shown as having advance solenoids 115 connected in a circuit line $h$ with normally open switch contacts 116 and retract solenoids 117 connected in a circuit line $i$ with normally open switch contacts 118. The double-acting air cylinder 22 for powering the upper platen 21 includes an advance solenoid 119 connected in a circuit line $j$ with normally open switch contacts 120 and a retract solenoid 121 connected in the circuit line $k$ with normally open switch contacts 122. Similarly, the double-acting air cylinder 31 for powering the lower platen 27 includes an advancing solenoid 123 connected in a circuit line $l$ with normally open switch contacts 124 and a retract solenoid 125 connected in a circuit line $m$ with normally open switch contacts 126, as shown. Each of the air cylinders 66, 66', 22 and 31 may be of the type manufactured by The Bellows Co. of Akron, Ohio.

To refill the die box 11 with air once the vacuum forces are released, a valve 127, which is operated by a solenoid 128 and opens to atmosphere as at 129, is connected with line 49 as shown via line 127a. The valve may be a Skinner solenoid valve Model L2DB4–150 of the type manufactured by Skinner Chuck Co. of New Britain, Conn. and is operated by switch contacts 130 in circuit line $b_1$.

It may be assumed for the sake of simplicity and convenience that the normally open contacts 96, 99, 103, 109, 112, 114, 116, 118, 120, 122, 124, 126, and 130 are switch contacts closed by the timer motor T for the length of time required in each instance, and at the proper time, but obviously they could be limit switches located in the path of the various moving elements to operate the components in proper sequence. For instance, the switch contacts 120 and 112 could be additional contacts of the limit switch 88, the contacts 124 and 116 could be limit switch contacts located in the path of platen 21, the contacts 99 could be limit switch contacts located in the path of platen 27, the contacts 103 and 96 could be limit switch contacts located in the path of the pistons of cylinders 66', and the contacts 122 could be limit switch contacts located in the path of the clamp frame 50.

*The operation*

Figure 3:
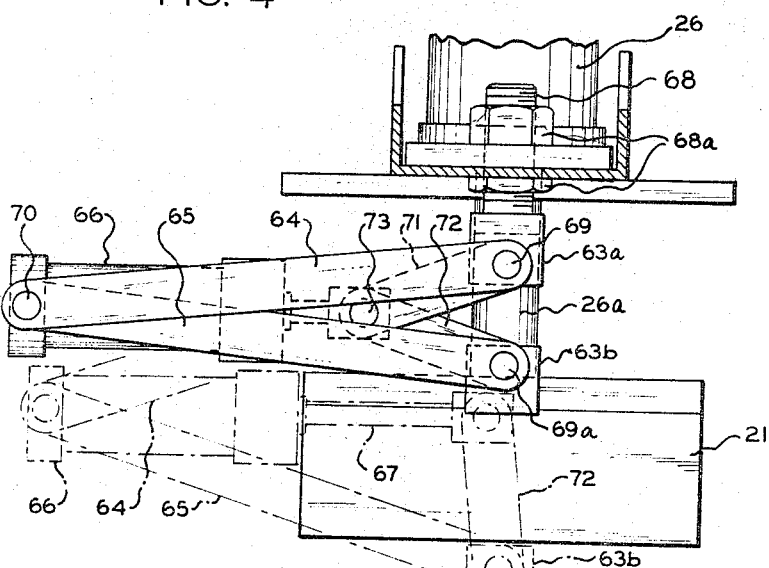
FIGURE 3 is an enlarged, fragmentary, side elevational view illustrating particularly the toggle mechanism for loading the upper platen of the machine, the chain lines illustrating the open or force applying position of the toggle mechanism.

Once the sheet advancing chains 34 and 35 have moved to draw an unformed portion of the plastic web 10 between the die boxes 11 and 12, the timer T operating cylinder 83 in the manner defined in the application mentioned, the contacts 120 in line $j$ are closed to energize the advance solenoid 119 of air cylinder 22 and lower the upper die box 11 into engagement with the plastic web 10. At the same time the contacts 112 in circuit line $f$ are closed and when the cylinders 66 are able to do so, at the time the platen 11 has reached the position in which it is shown in FIGURE 3, they spread the links 64, 65 and 71, 72 a final increment which may be 1/32 of an inch to lock the platen in position. Then the contacts 124 in circuit line $l$ are closed and energize the advance solenoid 123 of the air cylinder 31 so that the lower platen 27 commences to move upwardly toward the plastic sheet 10. First of all, the clamp frame 51 will engage the plastic web 10 to clamp the sheet firmly between itself and the upper die box 11 and thereafter further upward movement of the piston rod 32 and platen 27 will cause the plug assist members 14 to deform the heated plastic as the plug assists 14 commence to enter the cavities 13. Just as the plastic web 10 commences to enter the cavities 13, the contacts 99 in circuit line *b* are closed and the solenoid 98 is energized to open the normally closed vacuum bleed valve 93 and bleed the air out of the cavities 13 at a controlled rate corresponding to the displacement of air within the cavities 13 which is caused by the plug assists and plastic entering the cavities 13. At the same time the contacts 116 in circuit line *h* are closed to energize the advance solenoids 115 of the cylinders 66' and, when the piston rod 32 reaches the limit of its upward travel, the links 64', 65' and 71', 72' are spread a final increment, which may be about 1/32 of an inch, to lock the die members 11 and 50 in sealed relation. Then the contacts 103 in circuit line *c* are closed and normally closed valve 100 is opened to admit air under pressure from the compressor accumulator tank to the air line 55 and to the interior of the plug box assembly 12. Just before the contacts 103 are closed and air valve 100 is opened, the contacts 96 in circuit line *a* are closed and the main vacuum valve 91 is opened to remove the remainder of the air from the female die 11. At the same time the contacts 109 are closed and valve 106 closes. Thus, both the air pressure developed in the plug assist box assembly 12 and vacuum forces are utilized to move the plastic into intimate contact with the die cavity walls to insure that the deformed plastic conforms exactly to the cavities 13 in detail.

Because the dies 13 are maintained at substantially room temperature, the plastic sets immediately upon contact with the metal of the die 11 and the set is uniform over all of the area of the plastic displaced within the cavities 13 because the plastic comes into intimate contact with all of the area of the die surface. For this reason it is only necessary for the die boxes 11 and 12 to remain closed for an instant. When the pressure within the plug assist box assembly 12 reaches a predetermined value, such as 40 p.s.i., the pressure switch 105 is actuated to open normally closed contacts 104 in circuit line *c* and, of course, deenergize solenoid 102 so that normally closed valve 100 closes immediately. In this way, then, the pressure is prevented from building to a point where it would separate the mold boxes and, of course, with the pressure streams being deflected by baffles 58, cold spots are not created by the air stream which would cause local hardening of the plastic during the forming operation. The male members 14 are maintained at a suitable temperature so that they also do not cause local hardening of the plastic when they engage it.

Once the plastic web 10 has been fully formed in the manner described, normally open contacts 109 in circuit line *d* can be opened to deenergize the solenoid 108 of the exhaust valve 106 and open the valve 106 to bleed air from the plug assist box assembly 12 to atmosphere. At the same time, the contacts 96 in circuit line *a*, and 99 in circuit line *b* are opened, and normally closed valves 91 and 93 are closed and release the vacuum forces in line 49 and vacuum box assembly 11. Also at this time, the normally open contacts 130 in line *b*, are closed and the solenoid 128 of valve 127 is energized so that the normally closed valve 127 is opened to furnish the vacuum box 11 with air. At substantially the same time, the contacts 118 in circuit line *i* and 126 in circuit line *m* are closed to energize solenoids 117 and 125, respectively, and first retract the piston rods of cylinders 66' so that the preloading forces are removed from the platen 27 and thence retract the platen 27. The clamp frame 51 will remain in engagement with the plastic web 10 as the plug assists 14 are retracted during the initial part of the retracting stroke because of the pressure developed in the cylinders 60. However, during the remainder of the stroke the pressure in cylinders 60 will be relieved with downward movement of the platen 27 and the clamp frame 51 will also be retracted from engagement with the plastic web 10. As soon as the frame 51 clears the sheet 10 the contacts 114 in circuit line *g* and 122 in circuit line *k* are closed to energize solenoids 113 and 121 and unlock and retract the upper platen 11. The timer T then will again energize cylinder 83 to power the advancing chains 34 and 35 and advance the plastic web 10 an increment sufficient to dispose unformed plastic between the die assemblies 11 and 12 once again, the rack 84 having been returned upwardly when the limit switch 88 was energized on the retract stroke of the rack 84 but failing to drive the shaft 46 because of the disengagement of the clutch 80. Accordingly, the cycle can be repeated.

It should be appreciated that the cycle requires only about two seconds to complete, and thus it should be clear that the machine operates much faster than conventional machines and is a considerable improvement in the art. Whereas the cavity die box of conventional machines has been maintained at a temperature of about 130° F., it now can operate at room temperature. The cylinders 66 and 66' which lock the die boxes 11 and 12 in assembled relation positively prevent any separation of the boxes 11 and 12 at the crucial moment when the air pressure within the plug assist box assembly 12 has reached a maximum and there is no need for a cooling period once the cups have been formed in the web 10 because the plastic virtually sets immediately over the whole surface of the plastic formed.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

What is claimed is:

1. In a differential pressure forming machine for molding articles in a sheet of thermoplastic material: a pair of oppositely disposed die support box frames mounted for relative movement toward and away from one another; aligned male and female die means for said frames; fluid pressure actuated means connected with one of said frames for moving it toward the other frame; means for supporting a web of plastic between said frames; means for sealing both frames at a time when they are brought into engagement with said web; means for applying a vacuum to one of said box frames; means for substantially simultaneously introducing air under pressure through a line into the other box frame at a line pressure; and pressure responsive means downstream from said line and in said other box frame continuously sensitive to the actual pressure of the air in said other box frame for disabling said means for introducing air under pressure and limiting the pressure of the air in said other box frame to a maximum designated pressure less than said line pressure.

2. In a differential presure forming machine for molding articles in a sheet of thermoplastic material: stationary frame means; a pair of oppositely disposed die support frames thereon mounted for relative movement; means for supporting a plastic web therebetween; cooperating male and female die members arranged in aligned, spaced relation on said frames; fluid pressure operated motor means for moving at least one of said frames toward the other to engage said web; expandable toggle link means carried by one of said frame means and connected to react between said frame means and at least one of said die support frames and lock said one of said die support frames in position on said web; means actuatable to expand said link means and exert a loading force on said one frame in a direction toward the other frame; and means operable only thereafter for introducing a fluid under pressure to one of said die frames to form the web to the configuration of the female die means.

3. The combination defined in claim 2 in which said means actuatable to expand said link means comprises a fluid pressure cylinder and a piston rod therein; and said link means comprises: a block connected to said stationary frame means, a block connected to said one of said die support frames, links connected to the rear of said cylinder and to each of said blocks, and links connected to said piston rod and to each of said blocks.

4. In a differential pressure forming machine for forming articles in thermoplastic material; frame means; a pair of oppositely disposed die support platens mounted in spaced relation thereon for movement toward and away from one another; a female die box on one of said platens and a plug assist die box on the other with the plug assists in alignment with the cavities of the female die means; means for supporting a web of formable plastic between said die boxes against which said boxes seal when they are brought together; means for moving said female die box into engagement with the web; means for thereafter moving said plug assist die box into engagement with said web and deforming said web into said cavities with said plug assists; means for introducing air through a line under pressure into said plug assist die box after said plug assist die box has traveled to its extended position; means for substantially simultaneously evacuating the air from said female die box; and means sensitive to the pressure in said plug assist die box in said plug assist die box and for terminating the introduction of air under pressure to said plug assist die box when a predetermined pressure less than said line pressure has been reached therein.

5. In a differential pressure forming machine for forming articles in a sheet of thermoplastic material: frame means; a pair of oppositely disposed, vertically spaced, die support platens mounted in spaced relation thereon for movement toward and away from one another; a female die means with cavity means on one of said platens and a plug assist die means with plug assist means on the other, the plug assist means being in alignment with the cavity means of the female die means; means for supporting a web of formable plastic between said die means against which said die means seal when they are brought together; an electrical control circuit; first fluid pressure operated motor means connected in said circuit for moving said female die means into engagement with the web; second fluid pressure operated motor means connected in said circuit for moving said plug assist die means into engagement with said web and deforming said web into said cavity means with said plug assist means; expandable toggle linkage means carried by said platens and reactable between said frame means and said platens for preloading said platens and locking them against said web; means connected in said circuit and operable to expand said linkage means; means connected in said circuit for introducing air under pressure into said plug assist die means only after said linkage means has been expanded; means for substantially simultaneously evacuating the air from said female die box; means connected in said circuit for thereafter retracting said first and second fluid pressure operated motor means and moving said platens away from said web; and means connected in said circuit releasing said linkage means to contract at the time said platens move away from said web.

6. In a differential pressure forming machine for forming articles in thermoplastic material: frame means; a pair of oppositely disposed die support platens mounted in spaced relation thereon for movement toward and away from one another; a female die box on one of said platens and a plug assist die box on the other with the plug assists in alignment with the cavities of the female die means; said plug assist die box including a clamp frame and a plug assist plate mounted therein for relative movement therewith; yieldable means connecting said clamp frame and plug assist plate; means for supporting a web of formable plastic between said die boxes against which said boxes seal when they are brought together; means for moving said female die box into engagement with the web; means for moving said plug assist die box toward said web with said clamp frame first engaging said web and said plug assist plate continuing to move to deform said web into said cavities with said plug assists; means for introducing air under pressure into said plug assist die box after said plug assist die box has traveled to its extended position; means for simultaneously evacuating the air from said female die box; and means in said plug assist die box and sensitive to the pressure in said plug assist die box for terminating the introduction of air under pressure to said plug assist die box when a predetermined pressure has been reached therein.

7. The combination defined in claim 6 in which said yieldable means comprises fluid cylinders mounted to one of said clamp frame and plug assist plate with the piston rods thereof mounted to the other.

8. In a differential pressure forming machine for molding articles in thermoplastic material: frame means; a pair of oppositely disposed mold frames mounted thereon; one of said frames including cavity means and the other comprising an air box frame; means connected with at least one of said frames for moving it toward the other frame; means for supporting a web of plastic between said frames; means for applying a vacuum to said cavity means; line means for introducing fluid under pressure into the air box frame at a line pressure greater than that desired in said air box frame; and pressure responsive means, downstream from said line means and sensitive to the pressure in said air box frame, disabling the fluid pressure introducing means when a designated pressure less than said line pressure is reached in said air box frame.

9. In a differential pressure forming machine for forming articles in a sheet of thermoplastic material: frame means; a pair of oppositely disposed, vertically spaced, die support platens mounted in spaced relation thereon; one of said platens having a female die with cavity means and the other having an air box; means for supporting a web of formable plastic between said platens; an electrical control circuit; motor means connected in said circuit for moving one of said platens to the other and into engagement with the web; expandable toggle linkage means reactable between said frame means and said movable platen for locking said platen against said web; means connected in said circuit and operable to expand said linkage means; means connected in said circuit for introducing air under pressure into said air box only after said linkage means has been expanded; means for substantially simultaneously evacuating air from said cavity means; means connected in said circuit for thereafter retracting said motor means and moving said movable platen away from said web; and means connected in said circuit releasing said linkage means to contract to permit said platen to move away from said web.

10. In a differential pressure forming machine for forming articles in thermoplastic material: frame means; a pair of oppositely disposed die support platens mounted in spaced relation thereon for movement toward and away from one another; a female die box on one of said platens and a plug assist die box on the other with the plug assists in alignment with the cavities of the female die means; means for supporting a web of formable plastic between said die boxes against which said die boxes seal when they are brought together; means for moving said female die box into engagement with the web; means for thereafter moving said plug assist die box into engagement with said web and deforming said web into said cavities with said plug assists; means for introducing air under pressure into said plug assist die box after said plug assist die box has traveled to its extended position; means for substantially simultaneously evacuating air from said female die box; and means for terminating the introduction of air under pressure to said plug assist die box when a predetermined pressure has been reached therein; said means actuatable to expand said link means comprising an air cylinder with a piston rod therein; and said link means comprising: a member connected to said stationary frame means, a member connected to said one of said die support frames, links connected to the rear of said cylinder and to each of said members, and links connected to said piston rod and to each of said members.

11. In a differential pressure forming machine for molding articles in thermoplastic material: frame means; a pair of oppositely disposed mold frames mounted thereon; one of said frames including mold cavity means and the other comprising an air box frame; means connected with at least one of said frames for moving it toward the other frame; means for supporting a web of plastic between said frames; means for applying a vacuum to said cavity means; toggle linkage means reactable between said frame means and movable frame to a dead center position to positively lock said movable frame against the plastic web; motor means independent of said frame moving means for moving said toggle linkage means to and from dead center position; and means operable only after said toggle linkage has been moved to dead center position for introducing air under pressure to said air box frame to aid the differential pressure molding operation.

12. The combination defined in claim 8 wherein expandable toggle linkage means is reactable between said movable frame and frame means to a dead center position lock said frame against said web prior to the time said means for introducing fluid under pressure is operated.

References Cited

UNITED STATES PATENTS

| | | | |
|---|---|---|---|
| 1,711,978 | 5/1929 | Wanders | 18—20 |
| 2,058,880 | 10/1936 | Hunt | 18—20 |
| 2,282,423 | 5/1942 | Kopitke | 18—19 X |
| 2,356,634 | 8/1944 | Von Opel | 18—30 |
| 2,371,547 | 3/1945 | Rosenlund et al. | 18—30 |
| 2,478,823 | 8/1949 | Halbach | 18—30 |
| 2,962,758 | 12/1960 | Politis | 18—19 X |
| 3,004,288 | 10/1961 | Gardner | 18—19 X |
| 3,025,566 | 3/1962 | Kostur | 18—19 |
| 3,034,175 | 5/1962 | Hehl | 18—30 |
| 3,059,810 | 10/1962 | Edwards. | |
| 3,074,110 | 1/1963 | Mard et al. | 18—19 X |
| 3,105,270 | 11/1963 | Fibish | 18—19 |
| 3,161,915 | 1/1964 | Thiel | 18—19 |
| 3,166,790 | 1/1965 | Keys | 18—19 |
| 3,193,881 | 7/1965 | Kostur | 18—19 |
| 3,245,122 | 4/1966 | Maurer | 18—30 |

WILLIAM J. STEPHENSON, *Primary Examiner.*

J. SPENCER OVERHOLSER, *Assistant Examiner.*